United States Patent [19]

Mair et al.

[11] Patent Number: 4,693,642

[45] Date of Patent: Sep. 15, 1987

[54] LINE BORING APPARATUS

[75] Inventors: Alexander C. Mair, Bloomfield Hills; Leonhard Allgaier, West Bloomfield; Arnold O. DeHart, Rochester, all of Mich.

[73] Assignee: General Motors Corporation, Detroit, Mich.

[21] Appl. No.: 881,345

[22] Filed: Jul. 2, 1986

[51] Int. Cl.[4] .............................................. B23B 41/12
[52] U.S. Cl. ....................................... 408/59; 408/83; 408/708
[58] Field of Search ....................... 408/36, 44, 42, 56, 408/59, 79, 81, 83, 93, 707, 708

[56] References Cited

U.S. PATENT DOCUMENTS

| 2,167,673 | 8/1939 | Oberboffken | 408/93 |
| 2,401,838 | 6/1946 | Mitchell | 408/707 |
| 3,287,998 | 11/1966 | Goerhea et al. | 408/83 |
| 3,348,434 | 10/1967 | Plummer | 408/22 X |
| 3,438,287 | 4/1969 | Kampmeier et al. | 408/707 |
| 3,438,288 | 4/1969 | Kaiser | 408/707 |
| 4,475,853 | 10/1984 | Morgan | 408/56 |

FOREIGN PATENT DOCUMENTS 1405036 12/1965 France .................................... 408/83

Primary Examiner—Z. R. Bilinsky
Attorney, Agent, or Firm—Dean L. Ellis

[57] ABSTRACT

A line boring machine adapted for high speed line boring of engine blocks or the like featuring a series of spaced crankcase bulkheads, employs a motorized spindle capable of advancing, and boring bar from one end of the block therethrough to the other end to penetrate a remote cutting end of the bar serially through the bulkheads.

4 Claims, 6 Drawing Figures

LINE BORING APPARATUS

This invention relates to boring apparatus and more particularly to line boring apparatus for engine blocks and like workpieces requiring boring of a series of spaced walls or the like on a common axis, and further to boring bars therefor.

Conventional line boring machines for engine blocks and the like include a boring bar adapted for insertion along an axis, offset from the common axis of the holes to be bored, to an initial setup position in which it is placed fully within the spaced series of crankcase bulkheads or walls or the block so that a longitudinally spaced series of cutters on the bar, each respective to one of the bulkheads, may thereafter be aligned on the boring axis and advanced a short distance to present all cutters to the various bulkheads and penetrate therethrough under motorized spindle rotation. The setup requires indexing of the cutters on the bar at a predetermined angular position related to the axis offset direction, whereby to permit the bar insertion. Workpiece holding means on the boring machine are caused to lift the engine block to align the axes, the bar is advanced with the spindle turning to accomplish the boring, and then a reversal of steps occurs wherein the block is lowered again offsetting its bore axis from the bar axis to allow the various cutters to be withdrawn with the bar axially of the workpiece preparatory to removal of the workpiece from the machine station. Thus, this procedure is imposing in its precision setup requirements, correlative consumption of process time for each workpiece, and specialized work holding and spindle orientation apparatus.

Currently, much attention is being given to shortening of the process time of manufacturing operations of the above type and particularly to the design of manufacturing machinery which is free as can be of specialized setup procedures for different types of workpieces, and free of special machine requirements unique to specific workpiece designs within a given workpiece type. So-called "flexible" manufacturing systems focus on eliminating such uniqueness of machine dedication and aim instead at adaptability of a given machine to a variety of workpiece shapes and dimensions without extensive reconfiguration of workpiece holders, tool holders, motorized spindles, and operational routines.

By the present invention we aim to provide a line boring apparatus, and boring bar therefor, addressed to the current objectives in flexible manufacturing. More particularly, we aim to eliminate the detailed steps of workpiece processing for alignment of axes, presentation of cutters of a longitudinal cutter array within the workpiece, etc., and substitute therefor apparatus having a boring bar in which a single cutter portion at an end of the boring bar is employed to advance serially for high speed boring of each of the engine block bulkheads or like workpiece structure from one end thereof to the other.

In the conventional practice, great care is necessary to maintain accuracy of alignment of all of the longitudinally arrayed cutters on a common axis when presented to their respective walls to be bored. Numerous bearing journals and bearing assembly structures are thus typically included at axially spaced stations on the conventional boring bar for the security of such alignment under the strains of cutter engagement, etc. By the present invention, these are eliminated and instead the boring bar is adapted to serve for its own accurate guidance, on the workpiece itself, as the cutter end of the bar penetrates the same. However, additionally, the boring bar design of the present invention lends itself to a broadening use of very high rotational velocities in the boring bar, with gang cutters adapted under such high speeds to penetrate workpieces more rapidly than is conventional. Not only does the present apparatus satisfy the general objectives of improvement set forth above but it accommodates these higher speeds and prevents inaccuracies or failures as might otherwise result from dynamic whip in such a high-speed elongated bar.

In a preferred embodiment, the remote one cutter end of the boring bar has relatively closely spaced therebehind a hydrodynamic bearing shaped and otherwise suited to rest in the just-bored walls of the workpiece for support and guidance of the cutter end of the bar as the same is advanced and presented to the next in the series of walls to be bored. Cutter coolant fluid is conveyed to the bar and distributed to the vicinity of the boring cutter elements as well as to the hydrodynamic bearing. In high speed applications particularly, with spindle velocities as much as 5000 rpm or greater, the hydrodynamic bearing may operate satisfactorily with use of lighter fluids, advantageous for reasons well known in the art. The bearing design may easily be adapted, however, to a variety of spindle velocities and coolant viscosities suited thereto, to work within a broad operational range of applications as characterized by various workpiece material properties, etc.

These and other objects, features and advantages of the invention will be apparent from the following specification and from the drawings wherein.

Figure 1:
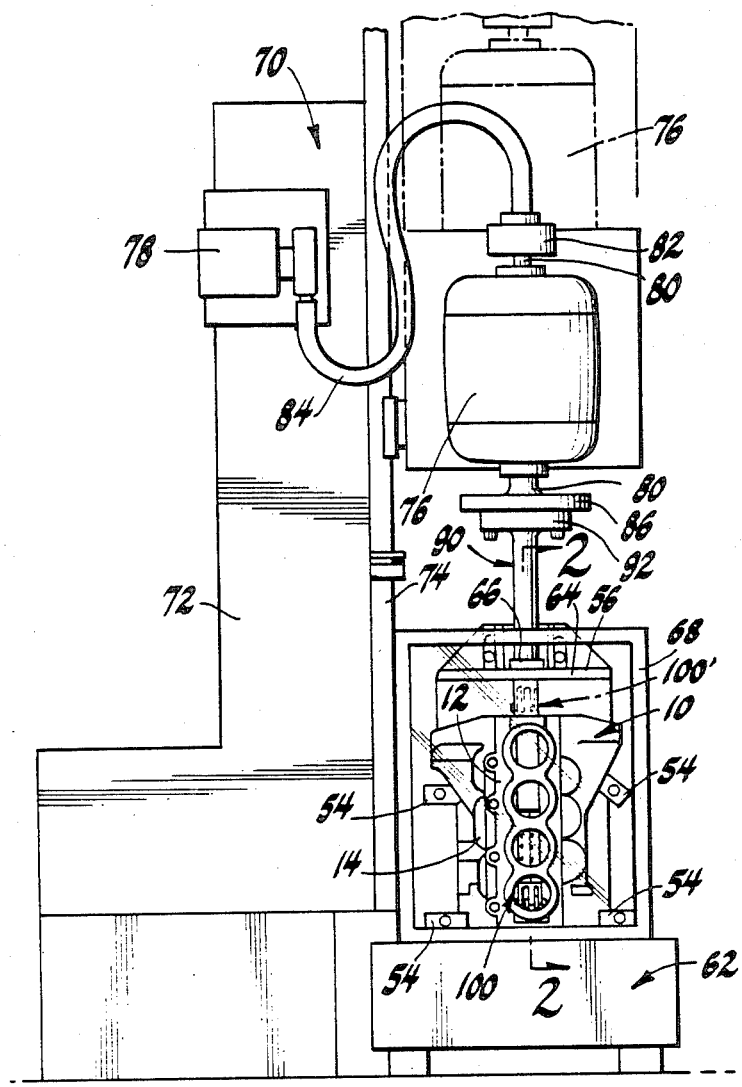
FIG. 1 is an elevational view of line boring apparatus in accordance with the invention, adapted for machining of an engine block workpiece.
Figure 2:
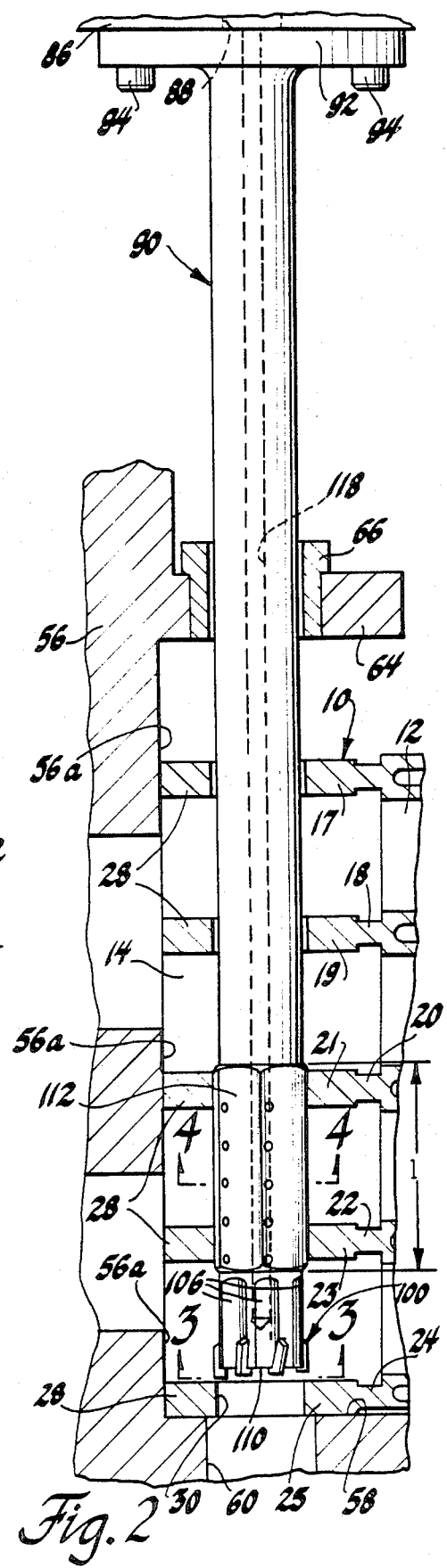
FIG. 2 is an enlarged sectional view taken generally along the plane indicated by lines 2—2 of FIG. 1.

Referring now to FIGS. 1 and 2, the same illustrates with use of the reference numeral 10 an automotive or like engine block workpiece having a single bank 12 of cylinders. The lower portion of the block comprises a crank case 14, preferably cast integrally with the upper cylinder bank portion of the engine block. The crank case portion 14 is adapted to define the upper portion of a complete engine crankcase, the lower portion of which is to be closed by an oil pan, not shown, subsequently attached to the block 10.

In the integral crankcase 14 there are conventionally included a pair of laterally spaced longitudinal extending side walls, not shown. These are laterally connected at spaced intervals intermediate their ends by five transverse bulkheads 16, 18, 20, 22 and 24 in which there are respectively provided enlarged laterally extending crank shaft journal receiving portions 17, 19, 21, 23 and 25. Each of these portions when machined, as is conventional, constitutes a bearing cap attaching portion drilled, reamed and threaded at their outer edges, not shown, for hollow dowels, also not shown. Further, each forms a semi-cylindrical bearing recess. Aligned on these dowels and attached over each such portion 17, etc. by cap screws or the like are bearing cap members 28, each of which is formed with a semi-cylindrical bearing recess complementary to that in the mated journal receiving portions 17, etc. When thus mated, such complementary recesses form cylindrical rough bores 30 for crank shaft journals, aligned on a longitudinal axis through each of the bulkheads 16, etc.

Rough bores 30 typically must undergo a series of machining operations preparatory to the finish machining steps, such preparatory steps perhaps including individual rough finishing of the semicylindrical recesses of each portion 17, etc. and each bearing cap 28 therefor, the drilling, reaming and threading of holes for the dowels and cap screws, etc. Then, upon assembling the bearing caps 28 to their respective journal receiving portions of the bulkheads 16, etc. the rough bores 30 formed by such assemblies typically are to be finish machined by line boring apparatus. Such apparatus is intended to finish machine the several rough bores 30 to a defined roundness and axial alignment, with an accuracy suited to precision reception of an engine crankshaft and any journal bearing members associated therewith.

Figure 6:
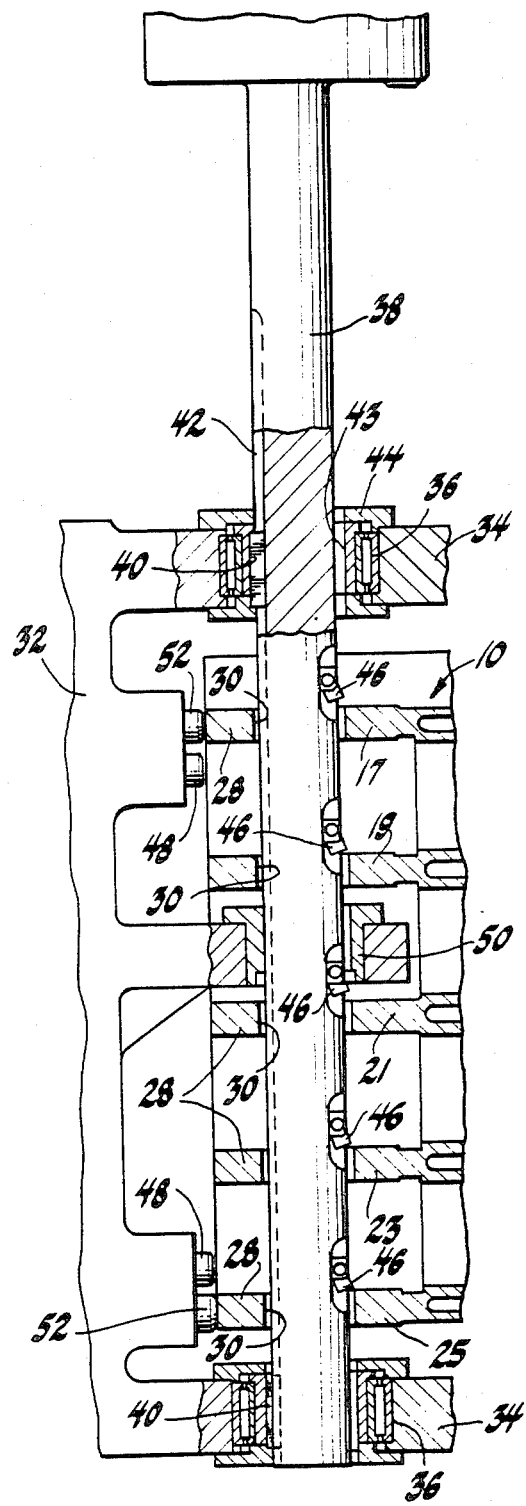
FIG. 6 is a view similar to FIG. 2 illustrative of prior art practice.

Referring to FIG. 6, there is illustrated a typical prior art line boring apparatus for achieving such finish machining. It includes a workpiece fixture or holder 32 having end frames 34 apertured on a common axis to receive bearings 36 which support a boring bar 38. The latter is adapted to be driven by a suitable motorized spindle, not shown, which is further adapted for selective rotational alignment or indexing of the boring bar and, with the aid of keys 40 residing in the boring bar longitudinal slot 42, a conjoint indexing of the inner races of bearings 36. Slots 43 in such inner races may thus be registered at a common angular position aligned with slots in the bearing cap members 44. Further, the motorized spindle is adapted to advance axially a short distance from the position shown, while turning, so that a longitudinal array of cutters 46, each respective to one of the several bulkhead journal receiving portions 17, etc. may be presented and penetrated therethrough for finish boring thereof.

However, preparatory to such boring, tool setup is required wherein workpiece positioning means in fixture 32 are provided including setup plungers 48 operative to displace the block rightwardly to a position wherein the axis of rough bores 30 is offset to enable insertion of the lower end of boring bar 38 axially firstly into the upper bearing 36 and, with the cutters 46 rotationally indexed opposite slots 43 etc., down through such bearing then serially into the upper of bores 30 through a slotted intermediate bearing 50, and finally into the lower bearing 36. Plungers 48 are then retracted to return the block to the position shown, seated on precision located setup pins 52 juxtaposed to engage machined reference surfaces on a pair of bearing caps 28. Thus, with the common axis of bores 30 again coincident with the axis of the boring bar 38, a rotation and axial feed of the cutters 46 each respectively into the bulkhead to which they are presented accomplishes the finish boring. Subsequently, the motorized spindle is indexed to again align the cutter with slots 43, the plungers 48 are actuated to offset the block from the boring bar axis, and the boring bar is withdrawing from the fixture 32.

By the present invention these several process steps are eliminated in favor of an improved procedure afforded by line boring apparatus as shown in FIG. 1. The block 10 is suitably secured as by clamping or other conventional means 54 to a workpiece fixture or pallet device 56, indicated best in FIG. 2, comprising a series of accurate reference surfaces 56a and a horizontal support reference surface 58 having an overlarge aperture 60 therein. While the block 10 is preferably mounted and supported at one end vertically against such support surface 58, it will be understood that it may likewise be fixtured for machining while oriented horizontally. While it would be no part of the invention, it should further be understood that the fixture 56 may be adapted as part of a material handling system for a supply of blocks 10, indicated only in part by reference numeral 62, representing any of a variety of workpiece transfer schemes adapted to place pre-fixtured workpieces accurately in position seriatim from a ready supply of such work-in-process. As here illustrated, however, for purposes of description of one embodiment of the invention, the fixture 56 is a permanent part of the machine tool installation, the fixture including an upper bearing support wall 64 apertured to receive a shaft bearing or bushing 66 of a size specially adapted to the hydrodynamic bearing boring bar of this invention, as will appear hereinafter. The workpiece block 10 is preferably surrounded by a suitable coolant spray containment housing 68 with a transparent vertical panel closing one side thereof to allow observation of the process.

The boring apparatus is indicated generally at 70, including a rigid upstanding pedestal 72 properly associated with the material handling transfer line 62 on a common floor mount. The pedestal includes conventional vertical support and guidance ways 74 captured by a carrier of a motorized spindle assembly 76 so the latter may be accurately guided for vertical translation over a range of positions along its axis indicated generally by broken and solid lines. Conventional ball screws or like electric motor operated actuation means, not shown, may well serve this translation function as understood in the art.

Mounted on a pedestal 72 or otherwise associated with the apparatus 70 is a conventional supply tank and electric pump 78 for a quantity of boring coolant fluid material. As contemplated in connection with the hydrodynamic bearing principles of this invention, the pump when associated with the restricted passage characteristics of the boring bar to which it is to be connected, is adapted to maintain a low-pressure constant supply of coolant fluid to such boring bar roughly in the order of 100 psi.

Figure 3:
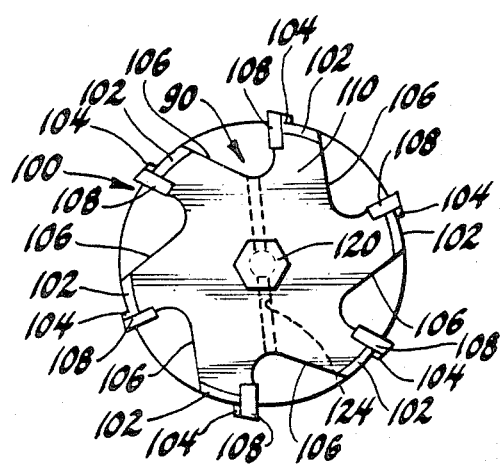
FIG. 3 is an enlarged end view of the boring bar taken along the plane indicated by lines 3—3 of FIG. 2.
Figure 5:
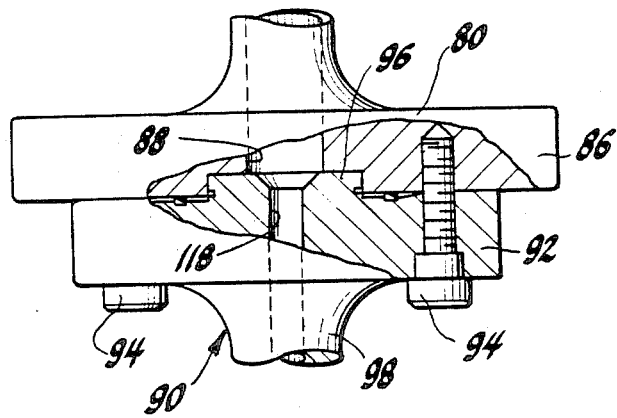
FIG. 5 is an enlarged partially broken away fragmentary view of a portion of FIG. 1.

The spindle assembly 76 may conventionally include a heavy duty electric motor with an armature shaft subassembly 80 projecting from either end of the motor housing. At its upper end, such shaft is provided with a conventional coolant supply fitting 82 which permits energized rotation of the shaft while simultaneously conveying coolant fluid under pressure through a connecting hose or other conduit 84 attached to the coolant supply 78. Such shaft subassembly 80 is of course hollow through its length, the shaft assembly terminating in an enlarged boring bar attachment hub 86. The latter, seen in greater detail in FIG. 5, terminates with a central passage 88 for conducting coolant fluid to the boring bar. The boring bar, generally indicated as 90 and seen best in FIG. 2, includes an enlarged mounting hub 92 secured by suitable fasteners 94 to hub 86. As indicated in FIG. 5, the end surface of hub 92 is slightly concave to partially define an accurate annular seating surface in the vicinity of the fasteners for proper alignment of the bar on the spindle 76, and further defines a pilot 96 received in a complementary pilot bore of hub 86 for coaxial alignment of the members. The shaft 98 of the boring bar 90 extends over a length suited to the depth of penetration of block 10 intended in the process, and carries at its remote end a gang or multiple cutter assembly 100 including individual boring cutter insert components 102. As is well known, each component 102 may include a cutter insert 104, best seen in FIG. 3, which is readily attachable and detachable to respective spline-like formations 106 on the cutting end of the boring bar, each insert 104 having a carbide or like cutting element 108. In the example shown, a series of six such cutter elements 108 are utilized and, as is conventional, the elements may be comprised of three opposed pairs which have varying profiles and varying axial positions relative the end reference surface 110 of the cutter assembly 100 to enable progressive engagement and chip removal from a surface of workpiece 10 to which the cutter assembly is presented.

Located a predetermined distance above the cutter assembly 100 is an integral hydrodynamic bearing structure 112 machined or otherwise formed on bar 90. Bearing 112 is of generally cylindrical configuration extending over the length L (FIG. 2), chosen to match the distance encompassed by the on-center spacing of the two most widely spaced of bulkheads 16, 18, etc., plus a wall thickness of one thereof. The purpose is to insure that the bearing 112 will be hydrodynamically supported in two of such bulkheads while the boring bar is advancing axially under actuation of spindle 76 to penetrate cutter assembly 100 the distance required to penetrate a third such bulkhead and bearing cap below the bearing 112, i.e. the axial distance represented by the thickness of such third bulkhead. As viewed in FIG. 2, the illustrative example is one wherein support of bearings 112 arises in bulkheads 20 and 22 not only in the position indicated where cutter assembly 100 is presented to bulkhead 24, but even further during continued downward displacement of boring bar 90 advancing the cutter assembly through the thickness of bulkhead 24 for finish boring the rough bore 30 therein.

Figure 4:
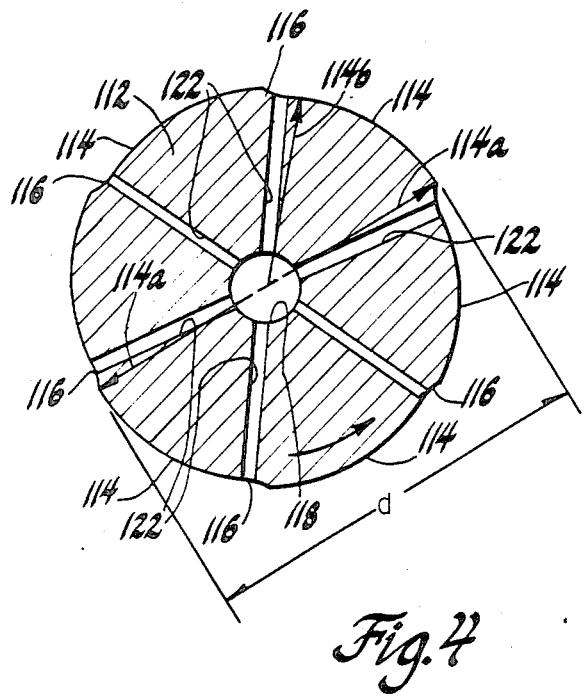
FIG. 4 is a further enlarged sectional view taken generally along the plane indicated by lines 4—4 of FIG. 2.

Referring to FIG. 4, the bearing 112 may partake of known hydrodynamic bearing configuration techniques and the illustrative assembly is one in which the cylindrical configuration of the bearing is modified with a series of six gradually deepening relieved surfaces 114 each commencing at a major radius 114a and diminishing to a minimum radius 114b whereat a fillet radius surface 116 rises to merge with the next major radius 114a.

As illustratively configured, the combination of two diametrically opposed such major radii 114a constitutes a major bearing diameter d which is sized suitably with respect to the finished diameter of the cut bores in bulkheads 20 and 22, for example, that the hydrodynamic bearing may function with a slight clearance from such finished bores such that coolant fluid conveyed to the six relieved surfaces 114 of the bearing can form a dynamically pressurized fluid film between the boring bar and these bulkheads, the latter serving as outer race elements of the hydrodynamic bearing. For example, with cutter assembly 100 configured to provide a finished bore diameter in these bulkheads of 1.9681±0.0003 in., diameter d of the bearing is preferably sized at 1.9669±0.0000 or −0.0002 in., for nominally a 0.0012 in. clearance.

Coolant fluid is conveyed through the passages of spindle assembly 76 including passage 88 and thence through a longitudinally extending bore 118 of boring bar 90 extending its entire distance to end surface 110 where it is plugged as at 120. Referring to FIG. 4, a series of radial passages 122 communicates bore 118 with each of the fillet surfaces 116 whereby to convey the low pressure coolant fluid resident in the bore to the relieved bearing surfaces 114. As seen best in FIG. 3, a further pair of radial passages 124 open to the cutter assembly 100 for splashing of coolant fluid against workpiece block 10 during cutter penetration thereof.

In the process, the axially translatable spindle assembly 76 is initially located upwardly in its broken line position shown and a block 10 is loaded by material handling device 62 into its proper position within housing 68 for axial alignment of the rough bores 30 with the axis of the spindle assembly. In this upper position, the spindle assembly has located boring bar 90 vertically such that bearing 112 resides in bushing 66 and cutter assembly 100 immediately therebelow, as indicated by the broken line position at 100'. In such position and with the block 10 loaded for boring, the cutter 100 is presented initially to the upper surface of bulkhead 16. Spindle assembly 76 may then be actuated downwardly to penetrate such upper bulkhead and bearing cap rough bore 30 for finish boring thereof while hydrodynamic bearing 112 advances through bushing 66. Sequentially thereafter, a continued advance of the spindle assembly causes cutter assembly 100 to penetrate the succeeding bulkheads and bearing caps assembled thereto while, as illustrated in FIG. 2, bearing 112 derives support immediately thereabove in finished bores of such bulkheads, for guidance of the boring bar.

We have found that with this improved process and apparatus, sufficient guidance is achieved with bearing 112 that axial alignment of the centers of the finished bores in bulkheads 16, etc. are maintained within 0.0002 in., even with a cutter penetration of as much as 0.0007 in. chipload while the spindle rotates at 8000 rpm. Roundness of each cut bore is simultaneously held to 0.0015 in. Such accuracy is particularly pleasing given the very high rotational velocities of the boring bar intended to meet the current desires for high speed flexible machining, particuarly in light alloy materials. Whereas conventional boring techniques in line boring apparatus employ much lower rotational speeds to avoid dynamic whipping and consequent functional inaccuracy in the usual line boring bar, such as represented at FIG. 6, the hydrodynamic bearing apparatus incorporated in this invention permits such very high rotational speeds without sacrifice of bore accuracy.

The embodiments of the invention in which an exclusive property or privilege is claimed are defined as follows:

1. Boring apparatus for workpieces which are characterized by a series of spaced walls to be bored on an axis comprising, a boring bar, a motorized spindle adapted to advance on its axis so as to present a remote one end of said boring bar serially along said workpiece axis, commencing adjacent one end of a workpiece, to each of the walls of such workpiece, a low pressure supply of boring coolant fluid, and a bar and coolant supply coupling joining the opposite end of said bar drivingly to said spindle and further to said coolant supply, said boring bar comprising at least one boring cutter element adjacent said one end thereof and a generally cylindrical hydrodynamic bearing adjacent the cutter element toward said opposite end of said bar, said bearing being sized closely to but less than the diameter of the bore cut by said cutter element whereby as said boring bar penetrates said spaced walls said bearing is adapted to utilize a cut surface of the workpiece as its outer bearing race under the dynamic pressure of coolant fluid resident at said bearing, and means for conveying fluid from said coolant fluid supply to said bearing.

2. Boring apparatus for workpieces which are characterized by a series of spaced walls to be bored on an axis comprising, a boring bar, a motorized spindle adapted to advance on its axis so as to present a remote one end of said boring bar serially along said workpiece axis, commencing adjacent one end of a work piece, to each of the walls of such workpiece, a low pressure supply of boring coolant fluid, and a bar and coolant supply coupling joining the opposite end of said bar drivingly to said spindle and further to said coolant supply, said boring bar comprising at least one boring cutter element adjacent said one end thereof and a generally cylindrical hydrodynamic bearing adjacent the cutter element and extending such a distance toward said opposite end of said bar as to be supported in bores of at least two of said spaced walls when said boring bar has penetrated the same and presents the cutter element to a third of said spaced walls, said bearing being sized closely to but less than the diameter of the bore cut by said cutter element whereby as said boring bar penetrates said spaced walls said bearing is adapted to utilize the cut surfaces of said at least two walls as its outer bearing race under the dynamic pressure of coolant fluid resident at said bearing, and means for conveying fluid from said coolant fluid supply to said bearing.

3. A boring bar adapted for line boring of a series of spaced walls of a workpiece, said bar comprising an elongated body portion, an enlarged coupling portion adjacent one end of the body portion for connecting the bar to a motorized spindle, coolant fluid passageway means extending longitudinally of said body portion from said coupling portion, cutter means adjacent the opposite end of said body portion, and a hydrodynamic bearing in said body portion adjacent said cutter means extending toward said one end a distance to be supported at substantially spaced cut surfaces of the workpiece, said bearing comprising an angularly spaced series of hydrodynamic longitudinal grooves adapted for dynamic pressurization of coolant fluid resident between said grooves and the workpiece surface juxtaposed thereto, and radial passage means connecting said groove with said longitudinal passage means.

4. Boring apparatus for workpieces which are characterized by a series of spaced walls to be bored on an axis comprising, a boring bar, a motorized spindle adapted to advance on its axis so as to present a remote one end of said boring bar serially along said workpiece axis, commencing adjacent one end of a work piece, to each of the walls of such workpiece, a low pressure supply of boring cutter coolant fluid, and a bar and coolant supply coupling joining the opposite end of said bar drivingly to said spindle and further to said coolant supply, said boring bar comprising at least one boring cutter element adjacent said one end thereof and a generally cylindrical hydrodynamic bearing adjacent the cutter element and extending such a distance toward said opposite end of said bar as to be supported in bores of at least two of said spaced walls when said boring bar has penetrated the same and presents the cutter element to a third of said spaced walls, said bearing including an angularly spaced series of longitudinal lands sized closely to the diameter of the bore cut by said cutter element and defining a series of intervening longitudinal grooves of such cross-sectional shape whereby as said boring bar penetrates said spaced walls said bearing is adapted to utilize the cut surfaces of said at least two walls as a dynamic bearing race bearing the dynamic pressure of coolant fluid resident at the grooves of said bearing, and means for conveying fluid from said coolant fluid supply to the grooves of said bearing and to said cutter element.

* * * * *